Figure 1:
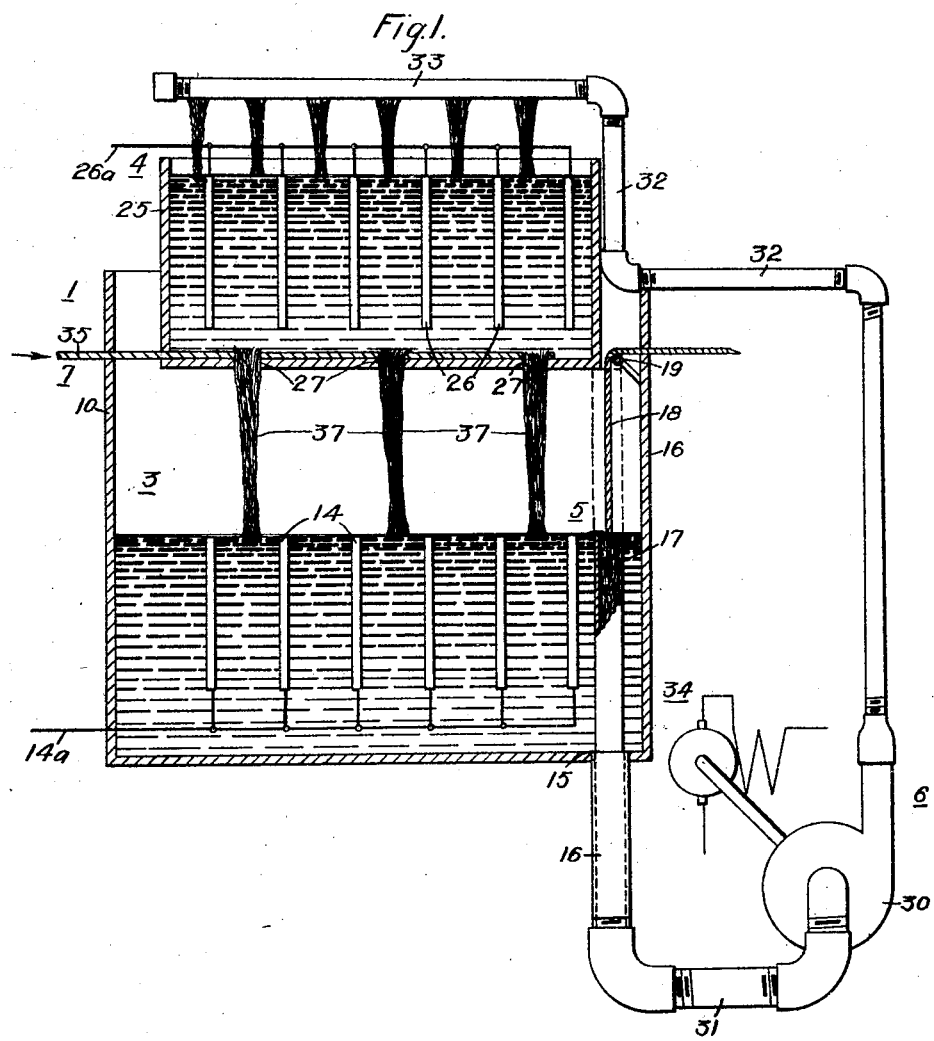

L. W. CHUBB.
CONTROL APPARATUS.
APPLICATION FILED JUNE 9, 1919.

1,409,670.

Patented Mar. 14, 1922.
2 SHEETS—SHEET 1.

WITNESSES:
J. A. Helsel
W. P. Oley

INVENTOR
Lewis Warrington Chubb
BY
ATTORNEY

L. W. CHUBB.
CONTROL APPARATUS.
APPLICATION FILED JUNE 9, 1919.
1,409,670.
Patented Mar. 14, 1922.
2 SHEETS—SHEET 2.
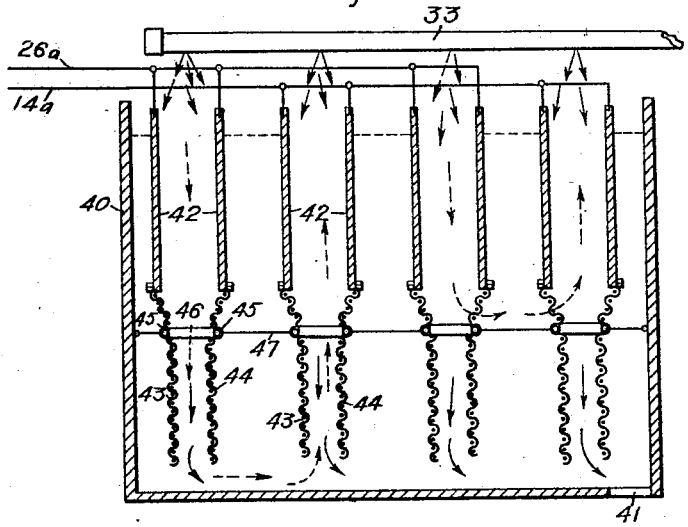
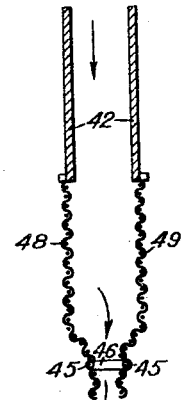
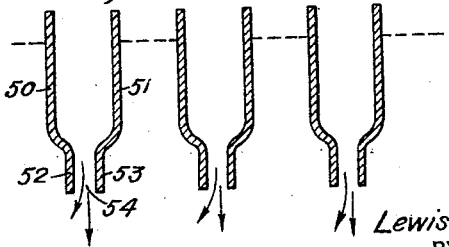
WITNESSES:
J. A. Helsel
W. P. Coley
INVENTOR
Lewis Warrington Chubb.
BY
ATTORNEY

UNITED STATES PATENT OFFICE.

LEWIS WARRINGTON CHUBB, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,409,670.     Specification of Letters Patent.     Patented Mar. 14, 1922.

Application filed June 9, 1919. Serial No. 302,793.

*To all whom it may concern:*

Be it known that I, LEWIS WARRINGTON CHUBB, a citizen of the United States, and a resident of Pittsburgh, in the county of Allegheny and State of Pennsylvania, have invented a new and useful Improvement in Control Apparatus, of which the following is a specification.

My invention relates to control apparatus and it has special relation to the variation of resistance in liquid rheostats.

One object of my invention is to provide a liquid rheostat wherein means are provided for actively utilizing a relatively large proportion of the electrode surfaces under high-voltage conditions of the rheostat, whereby arcing in the rheostat, when an induction motor or other device to be governed is started into operation, is avoided.

Another object of my invention is to provide a moving column of electrolyte between the electrodes, together with means for varying the length or cross-section of said column to change the resistance of the rheostat.

Other more specific objects of my invention will become evident from the following detailed description, taken in conjunction with the accompanying drawings, wherein—

Figure 1 is a diagrammatic view of one form of liquid rheostat constructed and arranged in accordance with the principles of the invention; and Fig. 2, Fig. 3 and Fig. 4 illustrate modifications thereof for accomplishing similar objects.

Referring to Fig. 1 of the drawings, the structure here shown comprises a liquid rheostat 1 having a lower electrode-containing compartment 3, an upper electrode-containing chamber or compartment 4, a suitable valve 5 for regulating the height of the liquid between the two compartments 3 and 4, an electrolyte-circulating apparatus 6 for the rheostat, and a further regulating device 7.

The rheostat 1 comprises a tank 10 of rectangular shape, for example. A plurality of plates or electrodes 14 are suitably located within the lower compartment 3 and are all electrically connected to a conductor or lead 14$^a$. The bottom wall of the compartment 3 is provided with an outlet 15 that communicates with the circulating apparatus 6.

The valve 5 may be of any suitable type for causing the level of the liquid in the lower intermediate compartment 3 to be raised or lowered, in accordance with the valve movements, and is here shown as comprising a hollow cylindrical member 17 that is adapted for telescopic operation within the discharge opening 15 and the associated pipe 16. The valve may be raised towards the illustrated dotted-line position by means of any suitable mechanism, which is illustrated here, in a simple manner, as comprising a rope or cable 18 that passes over a pulley or sheave 19 to a point outside of the rheostat.

The upper chamber or compartment 4 contains a plurality of spaced electrodes 26 which are all connected to a common lead or conductor 26$^a$. A plurality of apertures 27 are provided in the floor of the tank 5 and are located between pairs of the electrodes 26, for a purpose to be set forth. It will be understood that the conductors 14$^a$ and 26$^a$ are connected in the circuit to be governed, which, in the present instance, will be of the direct-current or single-phase type. However, my invention is not so restricted in its application, and the use of a rheostat, embodying the principles of my present invention, for polyphase operation is also contemplated by me. However, the present simplified illustration will be sufficient to clearly set forth the operating principles of the present novel apparatus.

The electrolyte-circulating apparatus 6 is shown as comprising a centrifugal pump 30, or the equivalent, that has its intake opening connected by a pipe 31 to the discharge pipe 16 of the rheostat, the delivery end of the pump being connected through pipes 32 to a spreader or manifold 33 that is located above the upper rheostat compartment 5. The manifold 33 is provided with a plurality of openings or a continuous slot in the underside, whereby the electrolyte delivered by the pump 30 is caused to flow downwardly between the various electrodes, as indicated by the arrows.

For the purpose of driving the pump 30, any suitable means, such as an electric motor 34, may be employed.

The regulating device 7 is shown as comprising a bar or plate 35 having a plurality of openings 36 that, in the illustrated position, register with the openings 27 in the floor of the upper compartment 5. However, it will be understood that any other suitable means for accomplishing the same purpose, namely, varying the cross-section of a column of liquid, may be employed, if desired.

The operation of my apparatus may be set forth as follows. Under starting conditions of the circuit to be governed, with the valve 5 occupying the illustrated lowermost position and with the pump 6 in operation, the electrolyte streams out of the spreader or manifold 33 and maintains the upper compartment 5 substantially full, thereby completely immersing the electrodes 26, by reason of the constricted openings 27 in the floor of the compartment. It will be understood that the dimensions of the upper compartment 4 are such that the level of the liquid in the lower compartment 3 may be raised materially without lowering the level of the liquid in the upper compartment to any appreciable extent. Continuous columns or spouts 37 of the electrolyte pour out of the openings 27, or, in other words, pass between the upper and the lower electrode-containing compartments 4 and 3, respectively, and maintain both sets of electrodes substantially immersed. The liquid is discharged downwardly through the hollow valve 5 into the pipe 16.

Consequently, the full electrode area in the liquid rheostat is active, even though the maximum resistance value is being provided for starting conditions of the device to be governed. In this way, arcing at the surface of the electrodes, which has caused considerable trouble in prior types of rheostats, is entirely eliminated.

To decrease the total resistance afforded by the rheostat, the valve 5 is raised by means of any suitable operating mechanism or by hand, whereby the level of the liquid in the compartment 3 is correspondingly raised, the electrolyte continuing to flow over the upper edges of the valve 5 and downwardly therethrough to the discharge pipe 16. In this way, the effective length of the columns or spouts 37 of electrolyte in the compartment 3 is reduced or, in other words, the level of the electrolyte in the compartment is moved in the opposite direction to the movement of the columns. As the result of the fact that the effective length of the columns or spouts of liquid is reduced and, at the same time, a body of electrolyte having the full cross-sectional area of the compartment 3 is gradually increased in volume, it follows that the resistance in the liquid path between the sets of electrodes 26 and 14 is correspondingly reduced. By gradually raising the valve 5 to its uppermost position, indicated by the corresponding dotted lines, the columns of liquid are entirely immersed, so that substantially a solid body of liquid extends from the one set of plates to the other. In this way, the resistance of the rheostat is reduced to a relatively low value as the operation of the apparatus to be governed is gradually completed.

If it is desired to still further increase the resistance of the rheostat under starting conditions, for example, the regulating apparatus 7 may be adjusted to move the openings 36 out of registry with the openings 27 in the floor of the compartment 4. The further constriction of the outlets from the compartment 4, whereby the cross-section of the columns or spouts of electrolyte is reduced, serves to increase the resistance between the sets of plates 26 and 14, although both sets remain immersed under all operating conditions.

In order to obtain a still higher ratio of resistance between the maximum and the minimum resistance value, in a liquid rheostat, the construction illustrated in Fig. 2 may be employed. The apparatus shown comprises a suitable tank or reservoir 40 having a discharge opening 41 with which the pumping apparatus 6 is preferably associated to supply a continuous flow of electrolyte through the manifold or spreader 33, as described in connection with Fig. 1.

A plurality of pairs of plates or electrodes 42 are suitably located in the rheostat, and alternate pairs are electrically connected to the conductors 14$^a$ and 26$^a$, respectively. Curtains or pieces of cloth 43 and 44, such as canvas, are attached to the lower ends of the plates comprising the respective pairs. Consequently, the column of liquid between the plates 42 is carried downwardly to the bottom of the tank, as indicated by the solid arrows, between the curtains 43 and 44, which thus guide the column of liquid. To ensure that the plate area is maintained at the full active value, or, in other words, that the entire inner surfaces of the plates 42 are at all times utilized, the curtains 43 and 44 are caused to approach each other, a certain distance below the edges of the plates 42, to provide a constricted opening or pocket, which will ensure a complete column of electrolyte above the constricted section and, in particular, between the plates 42.

For the purpose of providing the above-mentioned constricted opening or pocket, the illustrated apparatus or any equivalent thereof may be employed. The method shown consists in placing rods 45 of wood or other insulating material along the outside of the curtains 43 and 44 at the plane where it is desired to begin the constriction, and the rods 45 are held in the proper relation to each other by means of rope or wire 46. Furthermore, if desired, similar ropes or wires 47 may be employed to join adjacent pairs of curtains and, if the ends of the ropes or wires are fastened to the tank walls, the complete set of curtains is maintained in the proper position to ensure the flow of substantially steady columns of electrolyte downwardly between the pairs of plates.

The initial path of the electric current is indicated by the dotted arrows in the left-hand half of Fig. 2, namely, from one conductor 26ª downwardly between one pair of plates 42 and the corresponding curtains, along the moving stream near the bottom of the tank, and upwardly between the next set of curtains and plates to the other conductor 14ª. In this way, a liquid path of initially high resistance is provided in the rheostat.

By raising the level of the electrolyte outside of the respective pairs of plates, by means of the valve 4, such as shown in Fig. 1, or in any other suitable manner, the outer surfaces of the electrodes are also rendered active. During this process, the saturated curtains, although themselves non-conducting, serve to transmit the electric current from within one pair of curtains through the main body of electrolyte to the column within the adjacent pair of curtains, as indicated by the dotted arrows in the right-hand half of Fig. 2. When the maximum level, represented by the dotted line, is reached in the rheostat, the electrodes are approximately immersed and a relatively low total resistance of the rheostat is provided.

In the modification just described, it will be noted that, under low-level and high-resistance conditions of the rheostat, substantially one half the plate area is active, whereas, under high-level and low-resistance conditions, practically the entire plate area is utilized. Under all conditions, therefore, a sufficiently large proportion of the electrode surfaces is immersed to prevent the possibility of arcing at the electrodes.

In Fig. 3, the constriction in the curtains or cloths 48 and 49 that are attached to the lower ends of the electrodes 42 is placed considerably lower than is the case in Fig. 2. In this way, a large column of water is provided, except near the bottom of the curtains. It will be understood that, in some cases, the structure illustrated in Fig. 3 will be necessary to ensure a continuous filling of the space between the electrodes 42, particularly if they are of relatively great height.

Fig. 4 illustrates a plurality of pairs of plates 50 and 51, the lower ends 52 and 53 of which are offset in opposite directions, or are bent toward each other to provide a constricted channel or opening 54. This construction, therefore, provides the advantages of the structures shown in Fig. 2 and Fig. 3 to a certain degree. However, when the structure of Fig. 4 is employed, high current density at the ends of the plates necessarily occurs, whereas this disadvantage is avoided when the cloth curtains are employed. On the other hand, it will be appreciated that the fibrous curtains naturally deteriorate in time, by reason of the chemical action of the electrolyte, and require replacement.

I do not wish to be restricted to the specific structural details or arrangement of parts herein set forth, as various modifications thereof may be made without departing from the spirit and scope of my invention. I desire, therefore, that only such limitations shall be imposed as are indicated in the appended claims.

I claim as my invention:

1. In a liquid rheostat, the combination with a plurality of electrodes, of means for actively utilizing a relatively large proportion of the surfaces of said electrodes under high-voltage conditions of the rheostat.

2. In a liquid rheostat, the combination with a plurality of electrodes, of means comprising a moving column of electrolyte for flooding substantially the same area of said plates under varying resistance conditions of the rheostat.

3. In a liquid rheostat, the combination with a plurality of electrodes disposed in end-to-end relation, of means including a moving column of electrolyte between said electrodes for varying the resistance of the rheostat.

4. In a liquid rheostat, the combination with a plurality of sets of electrodes, of a moving column of electrolyte between the electrodes of each set, and means for constricting the sectional area of said column between the sets of said electrodes.

5. In a liquid rheostat, the combination with a plurality of electrodes, of means comprising electrolyte having materially different sectional areas between said electrodes.

6. In a liquid rheostat, the combination with a plurality of electrodes, of means including a moving column of electrolyte between said electrodes for varying the resistance of the rheostat, and means for varying the volume of said column.

7. In a liquid rheostat, the combination with a plurality of electrodes, of a moving column of electrolyte between said electrodes, and means for varying the effective length of said column.

8. In a liquid rheostat, the combination with a plurality of electrodes, of a moving column of electrolyte between said electrodes, and an oppositely moving body of electrolyte to immerse said column and vary the resistance of the rheostat.

9. In a liquid rheostat, the combination with a plurality of pairs of electrodes arranged one pair above the other, of means for directing a column of electrolyte from one pair of electrodes to the other, and means for varying the effective resistance of said column.

10. In a liquid rheostat, the combination with a plurality of pairs of electrodes arranged one pair above the other, of means for directing a column of electrolyte from one pair of electrodes to the other, means for constricting said column, and means for gradually immersing the column to vary the effective resistance of the rheostat.

11. In a liquid rheostat, the combination with a plurality of pairs of electrodes arranged one pair above the other, of means for directing a column of electrolyte from one pair of electrodes to the other, means for constricting said column, and means for adjusting the degree of constriction.

12. In a liquid rheostat, the combination with a plurality of pairs of electrodes arranged one pair above the other, of means comprising a moving vertical column of electrolyte for actively utilizing the pairs of confronting surfaces of said electrodes.

13. In a liquid rheostat, the combination with a plurality of pairs of electrodes arranged one pair above the other, a downwardly moving column of electrolyte between said electrodes, and an upwardly moving body of electrolyte to immerse said column and decrease the resistance of the rheostat.

14. In a liquid rheostat, the combination with a plurality of pairs of electrodes arranged one pair above the other, a circulating system for continuously delivering electrolyte above the upper electrodes, and valve means for varying the liquid level in a part of the rheostat.

15. A liquid rheostat comprising two compartments arranged one above the other and having restricted communication, and a plurality of sets of electrodes located in the upper and in the lower compartments and materially spaced apart.

16. A liquid rheostat comprising two compartments arranged one above the other and having relatively small communicating openings, a plurality of sets of electrodes located in the upper and in the lower compartments and materially spaced apart, and valve means for regulating communication between the upper and the lower compartments.

17. A liquid rheostat comprising two compartments arranged one above the other and having relatively small communicating openings, a plurality of electrodes in the upper and the lower compartments, a circulating system for continuously delivering electrolyte above the upper electrodes, and valve means for regulating the height of liquid in the lower compartment.

In testimony whereof, I have hereunto subscribed my name this 29th day of May, 1919.

LEWIS WARRINGTON CHUBB.